United States Patent [19]
Traynar et al.

[11] Patent Number: 5,107,252
[45] Date of Patent: Apr. 21, 1992

[54] VIDEO PROCESSING SYSTEM

[75] Inventors: Michael J. Traynar; Ian McNeil, both of Newbury, England

[73] Assignee: Quantel Limited, Newbury, United Kingdom

[21] Appl. No.: 410,155

[22] Filed: Sep. 20, 1989

[30] Foreign Application Priority Data

Sep. 20, 1988 [GB] United Kingdom ............... 8822062

[51] Int. Cl.$^5$ ..................... G09G 3/02; G09G 1/06
[52] U.S. Cl. ........................ 340/712; 340/724; 340/725; 358/22; 358/183
[58] Field of Search ............. 340/712, 724, 725, 729, 340/723, 749; 358/183, 22; 364/518, 522

[56] References Cited

U.S. PATENT DOCUMENTS

| | | | |
|---|---|---|---|
| 4,600,919 | 7/1986 | Stern | 340/725 |
| 4,797,836 | 1/1989 | Witek et al. | 340/725 |
| 4,947,255 | 8/1990 | Jackson et al. | 358/183 |
| 4,949,180 | 8/1990 | Miles | 358/183 |
| 4,951,040 | 8/1990 | McNeil et al. | 340/729 |
| 4,974,083 | 11/1990 | Bloomfield et al. | 358/183 |

*Primary Examiner*—Ulysses Weldon
*Assistant Examiner*—M. Fatahiyar
*Attorney, Agent, or Firm*—Cooper & Dunham

[57] ABSTRACT

A video processing system for use in combining a first video image sequence comprising a number of image frames and a second sequence of video image frames to create a composite video image sequence is disclosed. The system comprises a stylus and touch tablet combination and is arranged to define on a frame-by-frame basis at least four reference points representing corners of a keyframe in three dimensional space notionally projected onto a monitor screen. A transforming circuit transforms the addresses of pixels in a frame of the first video image sequence so as to cause the pixels to represent the frame as projected onto the display screen from the same location in three dimensional space as the keyframe. A combiner combines the transformed frame with a corresponding frame of the second video sequence to produce the composite video image sequence.

20 Claims, 2 Drawing Sheets

VIDEO PROCESSING SYSTEM

FIELD OF THE INVENTION

The present invention relates to video processing systems of the type comprising a viewing screen and manually operable control means.

BACKGROUND OF THE INVENTION

Video processing systems are known in which video signals representing a television picture are processed in real time to produce effects in which the picture appears to be manipulated in three dimensional space. An example of such a system previously manufactured by the present Assignee (Applicant) enabled the production of effects such as a three dimensional spin of the picture or a change in the position, size or view position of the picture using manual controls including a tracker ball. To produce these effects a frame of video signals to be processed is written to a framestore and a processing circuit responsive to signals set up by the manual controls determines successive addresses in the framestore from which successive video signals should be read in order to build up an output frame containing the processed picture. A monitor is provided for displaying successive processed frames as a moving picture so that an operator can observe the effect of his manipulation of the controls in real time. During each frame period the processing circuit responds to incremental control signals set up by use of the manual controls during the preceding frame.

One use to which a system such as that described hereinabove can be put is that of transforming a flat picture so that it can be placed exactly over a polygon (usually quadrilateral) on another picture to build up a composite picture. Such a transformation may be required for example where the first picture is say a view through a window and it is desired to place the first picture over a window in the second picture seen from different positions. While it is possible to achieve this result using the above described system there are practical problems because realistic superimposing of the first picture will involve a combination of three dimensional spin and changes in position, size and point of view of the first picture.

Another video processing system currently manufactured by the present Assignee (Applicant) and sold under the trade name "ENCORE" is described in our European Patent Application, Publication No. 0,283,159 and corresponding patent applications in the United States of America (Serial No. 159,780) now U.S. Pat. No. 4,951,040 and Japan (Serial No. 162099), the teachings of which are incorporated herein by reference. In the image processing systems described in these patent applications means are provided for representing the addresses of at least four reference points defining corners of a polygon notionally projected onto a viewing screen. User operable control input means enable the user to produce selected adjustment of the addresses to cause the reference points to define the corners of the polygon projected onto the screen after movement of the polygon in three dimensional space, and transforming means transform the addresses of individual picture elements which make up a video picture so as to cause the video picture to appear to be projected onto the viewing screen after undergoing the same movement in three dimensional space as the polygon. Thus, in this image processing system a three dimensional translation of a video picture can be defined by moving the corners of an originally rectangular polygon representing corners of an originally rectangular image to the corners of a quadrilateral representing the image screen in perspective. This technique is known as "corner pinning" and makes it possible to pin a video image over say a window defined in another video image to produce a combined video image.

Whilst this system provides satisfactory results in combining two images when the position of the insert picture remains substantially fixed, difficulties are encountered when the position and shape of the insert picture is required to change from one frame to the next in the other video picture. This is because the user is free to define the shape and movement of the polygon in three dimensional space but is unable to relate these parameters with particular frames in the two pictures. As a result unwanted artefacts, in the form of a visible boundary between the insert picture and the other picture or flicker for example, may appear in the combined video picture. In such cases the combined picture will be unacceptable.

OBJECTS AND SUMMARY OF THE INVENTION

It is an object of the invention to provide an improved video processing system.

It is also an object of the invention to provide an improved video processing system in which unwanted artefacts do not appear in a combined video picture.

According to one aspect of the invention therefore there is provided a video processing system comprising: a viewing screen; manually operable control means for generating address signals representing the addresses of at least four reference points defining the corners of a polygon notionally projected on said screen; means for effecting selective adjustment of said polygon address signals to produce manipulated address signals defining the corners of said polygon as projected on said screen after a movement of said polygon in three dimensional space; transformer means responsive to said manipulated address signals for transforming the addresses of video frames to produce respective manipulated video frames having a projected picture which has undergone the same movement in three dimensional space as said polygon; means for supplying a first sequence of input frames to said transformer means to produce a sequence of manipulated frames, wherein said polygon address signals are individually defined for each of said input frames; means for storing a sequence of said manipulated frames; means for storing a second sequence of input video frames; and means for keying stored manipulated frames over respective second input frames to produce a sequence of output frames.

According to another aspect of the invention there is provided a video processing system for use in combining a first video image sequence comprising a number of image frames and a second sequence of video image frames to create a composite video image sequence, the system comprising user operable means for defining on a frame-by-frame basis at least four reference points representing corners of a polygon in three dimensional space notionally projected onto a display screen, transforming means for transforming addresses of pixels in a frame of said first video image sequence so as to cause said pixels to represent the frame as projected onto the display screen from the same location in three dimensional space as the polygon, and combining means for combining the transformed frame with a frame of the second video image sequence thereby to produce said composite video image sequence.

In an embodiment of the invention, to be described in greater detail hereinafter, the user operable means comprises a stylus and touch tablet combination, per se well known, which is arranged to enable each of the reference points to be defined individually. This feature enables the user to position the polygon, or keyframe, as displayed on the display screen precisely at the desired location in the frame of the second sequence, which is also displayed on the monitor, at which the transformed frame of the first sequence is to appear.

In order to facilitate the combining of frames, the transforming means may be adapted to create a control image for each frame of the sequence, which control image is used by the combining means on a pixel-by-pixel basis to control the combining of the said transformed frame and the said second sequence frame. The use of a control image, or stencil, is per se well known in the general art of electronic graphic systems and enables the system to combine data representing the two image frames in accordance with a weighting factor defined by the control image data. In the present system the control image data is normally such that selected pixels in the frame of the second sequence are replaced by pixels representing the transformed frame of the first sequence.

Means may be provided for displaying a representation of the polygon as projected onto the display screen over a displayed frame of said second video sequence to facilitate positioning of said reference points. When combining two video sequences the operator will normally require the frame to be inserted to completely replace a feature in the other frame. Since the shape and position of the feature being replaced will most likely change from frame to frame the user will require a means by which the shape and position of the polygon may be readily adjusted between one frame and the next.

In order to facilitate access to each frame in the sequences the system may further comprise bulk storage means, in the form of a disc system for example, for storing said video sequences which storage means is adapted to deliver individual frames of said first and second video sequences to respective first and second frame store means via respective buffer means.

Once a composite video sequence has been produced, or indeed once each frame of the composite has been made, the operator may wish to preview the newly created combination and to this end the system may further comprise previewing means responsive to said user operable means for enabling the composite video sequence to be previewed on a frame-by-frame basis, the previewing means including keying means for keying a transformed frame over a corresponding frame of said second sequence in accordance with the corresponding control image frame.

Further features and advantages of the invention, together with those abovementioned, should become clearer from consideration of the detailed description of an embodiment of the invention that is given hereinafter with reference to the accompanying drawings.

DETAILED DESCRIPTION OF THE EMBODIMENT

Figure 1:
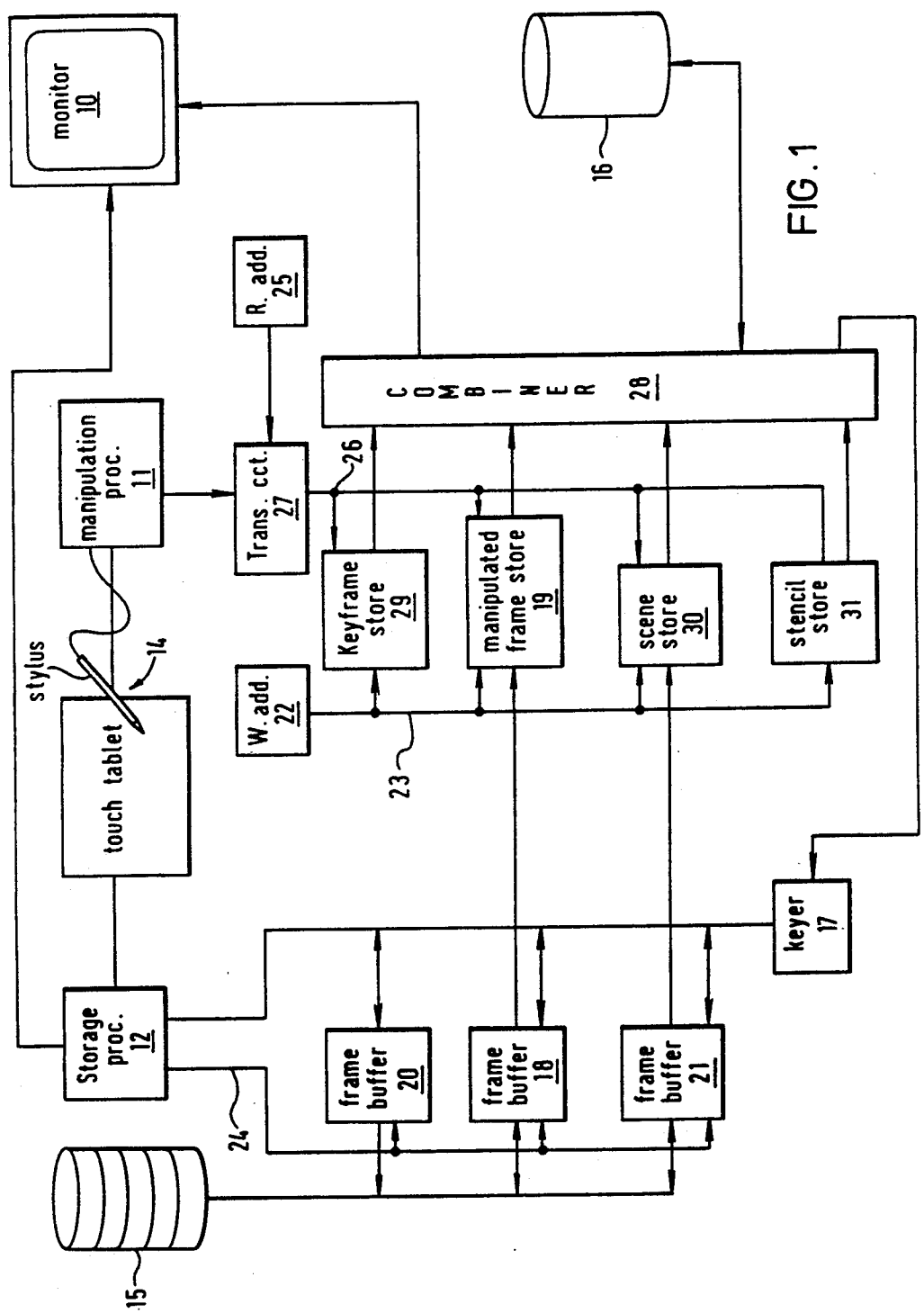
FIG. 1 shows a video processing system according to the present invention including means for defining a polygon.
Figure 2:
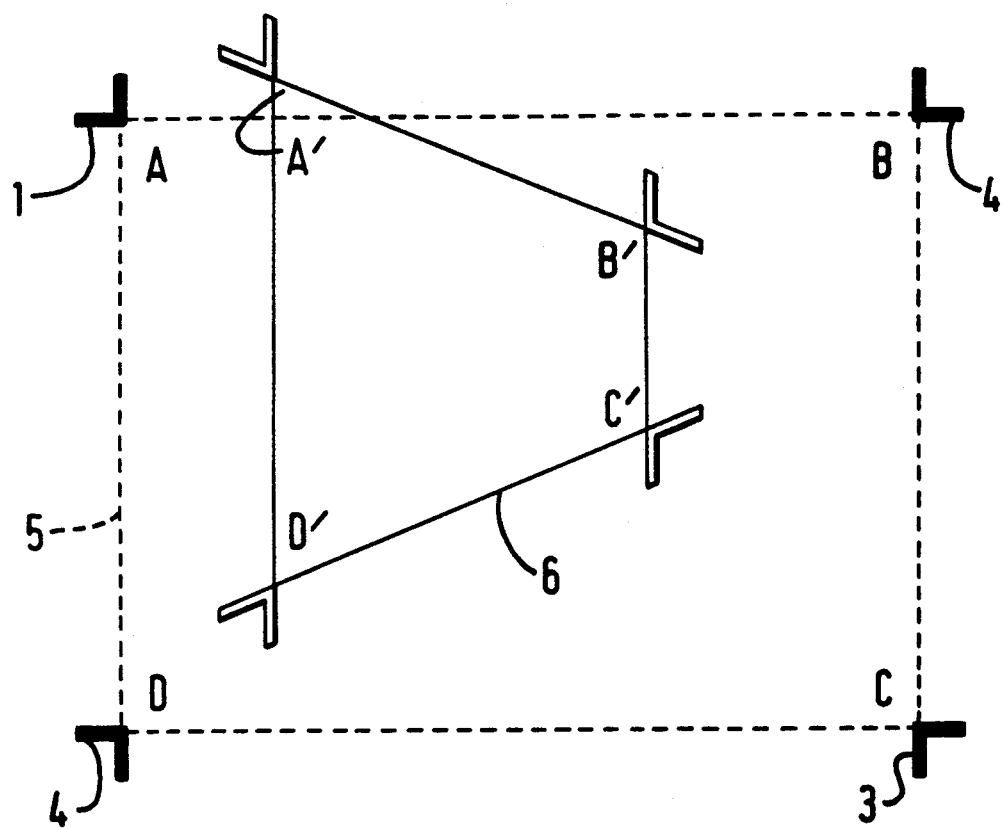
FIG. 2 shows a typical polygon being manipulated using the processing system of FIG. 1.

A video processing system exemplarily embodying the present invention is shown in FIG. 1 in which video images are displayed on a television-type colour monitor 10. The system is controlled by an image manipulation processor 11 and a video storage processor 12 each responding to commands from manually operable control means in the form of a pressure sensitive stylus and touch tablet combination 14. In response to operation of the stylus upon the touch tablet at least four reference points defining the corners of a polygon may be displayed on the monitor screen 10. These four reference points are shown in FIG. 2 of the accompanying drawings as corner pins 1,2,3 and 4 at respective corners A,B,C and D of a rectangle 5 shown in broken lines. The rectangle 5 represents a boundary on a television picture representing a video image projected on a viewing screen. Initially the boundary represented by the rectangle 5 may coincide with the edges of the monitor screen though this is not necessarily the case. Further operation of the stylus and touch tablet combination 14 will effect selective adjustment of the polygon address signals to define new polygon address signals. Corner pins are selected by moving a cursor displayed on the monitor screen over the desired pin by way of the stylus and touch tablet combination. Once selected, further movement of the cursor will cause the selected corner pin, for example pin A, to move. When corner pin A has been moved to the desired position A' the stylus and touch tablet can be used to fix it in that position. The corner pins, B,C and D are moved to positions B',C',D' in a similar manner to define a new polygon 6.

Returning now to FIG. 1, once the new position of the corner pins A',B',C',D' and thus the new polygon shape 6 have been defined the manipulation processor 11 is arranged to calculate the nature of a three dimensional movement of the original rectangle 5 as described in our abovementioned patent applications so that when it is projected back onto the two dimensional viewing screen it is seen as the newly defined polygon 6. Once this calculation has been performed the same transformation is then executed on the video frame to be transformed. Pixels at every address of a video frame are manipulated using known techniques and the thus manipulated frame will provide a projected picture which has undergone the same movement in three dimensional space as the polygon 6. The manipulated frame may be introduced into a second or background frame and thus an originally square first image frame may be introduced into a window of a background image frame and shown in perspective. Video image manipulation is repeated by way of the corner pins or a frame-by-frame basis for all video frames to be manipulated in a video clip, i.e for all frames in the video sequence to be combined. The shape of the framing polygon 6 hereinafter referred to as a "keyframe" may change from video frame to frame and thus the system in accordance with the present invention enables the combining of a first video sequence of frames (the "insert" image clip) with a second video sequence of frames (the "background" image clip) without noticeable artefacts (i.e. any boundary between the insert and background images) being observed when the resulting combined video image is displayed.

Each frame in the insert video clip is stored in the system of FIG. 1 by means in the form of a parallel transfer disc system 15 capable of real time operation at video rate. Details of a disc system for video signals are described in our U.S. Pat. No. 4,688,106, the disclosure of which is incorporated herein by way of reference. Alternatively a solid state storage device may be used such as our own solid state storage device sold under the trade mark "CAROUSEL RAMCORDER". The disc system 15 (or a second CAROUSEL RAMCORDER) also stores frames of the background video clip. Each frame of the insert image is manipulated and after each frame of said insert image has been manipulated it is stored in a second disc storage system 16. The manipulated insert image frames and the sequence of background image frames may then be played in synchronism at normal video rate, or less, the two sequences being combined by a keying device 17 and displayed as the combined video image on the monitor 10.

More specifically frames of the insert image are supplied from the disc system 15, via a first storage frame buffer 18 to a manipulation frame storage device 19. A second and a third frame storage buffer, referenced 20 and 21 respectively, are also provided which, in combination with storage processor 12, disc system 15 and buffer 18, may form part of a system manufactured by us and sold under the trade mark "HARRY".

The manipulation frame storage device 19 includes means for storing data defining two keyframes 6 for two video frames so that a keyframe 6 may be read from a first store means, manipulated, and then written to a second store means. This process may then be repeated interactively so that the once manipulated keyframe from the second store means is manipulated again and the new data written to the first store means. Each time this process is repeated the new keyframe is displayed on the monitor 10 over the background image allowing the operator to repeat the process until he has achieved the desired result, i.e. until he matches the keyframe to the desired area in which the insert video image is to appear. Insert image pixel data from buffer 18 is written to store 19 in conventional raster order under the control of addressing signals from a write address generator 22 supplied over a write address bus 23. Similarly write and read addresses for the storage buffers 18,20,21 are generated by the storage processor 12 and supplied over an address bus 24.

Manipulation of the image is achieved by reading the data in a different order to that in which it was written and, where necessary, interpolating to derive new picture points. An example of this method of manipulation is described in U.S. Pat. No. 4,437,121 now assigned to us, the disclosure of which is incorporated herein by way of reference and forms part of the present disclosure. Read addresses are therefore generated by a read address generator 25 and supplied to a read address bus 26 via an address transforming circuit 27 which transforms the read addresses so that the data is read in a different order. The nature of the transformation performed by the transforming circuit 27 is calculated by the manipulation processor 11, in response to newly defined polygon address signals from the stylus/touch tablet 14, which instructs the transforming circuit 27.

In operation, the first frame of the insert video image, is read from disc 15 and supplied to store 19 via frame buffer 18. The read address generator 25 generates read signals at video rate which are used to drive the transforming circuit 27. The transforming circuit 27 outputs read addresses transformed in accordance with instructions from the manipulation processor, causing store 19 to be read continually at video rate. A thus transformed insert video signal is output to a combiner 28, the output from which is supplied via a digital to analogue converter (not shown) to monitor 10. The combiner 28 may be of the kind described in our abovementioned European Patent Application Publication No. 0,283,159 and is arranged to operate on video signals from the stores 29 to 31 to produce a combined video signal which is output for display on the monitor 10. The combiner 28 is conditioned to superimpose keyframe video signals from the keyframe store 29 onto insert video signals from the manipulated framestore 19 or onto background video signals from the background framestore 19, and/or to superimpose the insert video from framestore 19 onto the background video signals from framestore 30 under the control of a stencil in stencil store 31. The background data can be combined with the keyframe data and displayed. This enables the user to see manipulations of the keyframe on the display and thus to move the keyframe and modify its shape so that it bounds the area of the background image where the insert image is to appear. Additionally, the insert data and the keyframe data can be combined and displayed. Thus, in response to a command generated by operation of the stylus/touch tablet combination 14 a rectangular, or other preferred shape, keyframe is displayed over the first frame of the background video clip by addressing the keyframe storage device 29. The size and shape of the keyframe is then adjusted by the user, if necessary, and the first frame of the insert video clip, is transformed so that it fits within the manipulated keyframe. The keyframe address signals may be further manipulated as described above causing a similar manipulation to be performed on the insert image bounded therein to position the insert image exactly at the required location on the background image.

It should be noted that as abovementioned the insert image in store 19, manipulated for insertion into a scene, can be compared with a frame from the background video clip to enable the insert image to be positioned exactly. To this end, the first frame of the scene clip is therefore transferred to a scene frame storage device 30 from disc 15 via frame buffer 21. The position and shape of the keyframe also defines an eight bit stencil or control image stored in a stencil frame storage device 31. The stencil image from store 31 is used to control the combining of the insert image from store 19 with the background image from store 30 in the combiner 28 as is well known by simultaneously addressing stores 19,29,30 and 31 to extract the image data for combination and display. With the monitor 10 showing the combined image the abovementioned interactive manipulation of the keyframe corner addresses is possible until the manipulated insert image is correctly positioned relative to the background image.

Once the operator has performed the required manipulation on the first insert image frame, the insert image data from store 19 and the corresponding stencil data from store 31 are written to the second disc storage system 16. The system is now ready for the next video frames of both the insert and the background clips which are read from disc 15 and supplied to stores 19 and 30 respectively. If the area of the background image into which the manipulated image is to be inserted has not changed between frames then the keyframe 6 defined for the previous frame may be called from the keyframe store 29 and used without further modification. However, the area of the background clip may have changed and therefore the address signals defining the keyframe may require modification. This modification can be made interactively by moving the corners of the keyframe on the display to define a new insert video frame position for the current video frames as described above in relation to the first video frames. Once modified the keyframe data is used to modify the present frame of the insert image and to create a new stencil for use in combining the thus modified insert image frame and the background frame. The modified insert image frame and its corresponding stencil are written to the second disc store 16. This process is repeated for each frame in the video clips until the end of both clips.

The second disc store 16 may form part of the manipulation side of the system, having many similarities to the system manufactured by the present Assignee and sold under the trade mark "ENCORE", and may therefore be replayed at video rate to show the manipulated clip. However the combiner 28 may also pass the manipulated image clip from disc 16, along with its manipulated stencils, to keyer 17 which also receives, in synchronism, data for the background clip from disc 15 via buffer 21. The operator can then see a preview of the combined image running in real time. He may also freeze the combined image at any point in the clip or slow it down in order to check that the manipulated image is always in its desired position, and not flickering or showing artefacts, and (if necessary) modify any of the manipulated insert frames.

Once the operator is satisfied with the combined image, the combined image data output from keyer 17 may be written to disc 15 via frame buffer 20 and the system made ready for creation of the next effect.

In an alternative configuration store 16 stores manipulation instructions, which are transferred to the transformation circuit on a frame-by-frame basis to effect image manipulation in real time. The disc storage system 15 may only be capable of transferring one video clip in real time and therefore manipulations may be defined by reading a single frame from store 19 for each cycle.

The present invention therefore provides a system for corner pinning a moving insert video clip against a moving background video clip in which different perspectives are required throughout the clip. Furthermore, in addition to a static frame-by-frame test, the operator may also see a dynamic preview to ensure that the programmed effect generates the required illusion without artefacts.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. A video processing system comprising: a viewing screen; manually operable control means for generating address signals representing the addresses of at least four reference points defining the corners of a polygon notionally projected on said screen; means for effecting selective adjustment of said polygon address signals to produce manipulated address signals defining the corners of said polygon as projected on said screen after a movement of said polygon in three dimensional space; transformer means responsive to said manipulated address signals for transforming the address of video frames to produce respective manipulated video frames having a projected picture which has undergone the same movement in three dimensional space as said polygon; means for supplying a first sequence of input frames to said transformer means to produce a sequence of manipulated frames, wherein said polygon address signals are individually defined for each of said input frames; means for storing a sequence of said manipulated frames; means for storing a second sequence of input video frames; and means for keying stored manipulated frames over respective second input frames to produce a sequence of output frames.

2. A video processing system as claimed in claim 1 wherein polygon address signals are defined while displaying said polygon over its respective frame of said second sequence of input frames.

3. A video processing system as claimed in claim 1 wherein said stored manipulated frames are keyed over said second frames in real-time allowing a preview of the output sequence to be viewed before being recorded.

4. A video processing system for use in combining a first video image sequence comprising a number of image frames and a second sequence of video image frames to create a composite video image sequence, the system comprising user operable means for defining on a frame-by-frame basis at least four reference points representing corners of a polygon in three dimensional space notionally projected onto a display screen, transforming means for transforming addresses of pixels in a frame of said first video image sequence so as to cause said pixels to represent the frame as projected onto the display screen from the same location in three dimensional space as the polygon, and combining means for combining the transformed frame with a frame of the second video image sequence thereby to produce said composite video image sequence.

5. A system as claimed in claim 4, wherein the user operable means is arranged to enable each of the reference points to be defined individually.

6. A system as claimed in claim 4 or 5, wherein the user operable means comprises a stylus and touch tablet combination.

7. A system as claimed in claim 4, wherein the transforming means is adapted to create a control image for each frame of the sequence, which control image is used by the combining means on a pixel-by-pixel basis to control the combining of the said transformed frame and the said second sequence frame.

8. A system as claimed in claim 4, wherein means are provided for displaying a representation of the polygon as projected onto the display screen over a displayed frame of said second video sequence to facilitate positioning of said reference points.

9. A system as claimed in claim 4 further comprising bulk storage means for storing said video sequences which storage means is adapted to deliver individual frames of said first and second video sequences to respective first and second frame store means via respective buffer means.

10. A system as claimed in claim 4, further comprising previewing means responsive to said user operable means for enabling the composite video sequence to be previewed on a frame-by-frame basis, the previewing measn including keying means for keying a transformed frame over a corresponding frame of said second sequence in accordance with the corresponding control image frame.

11. A video signal processing system comprising:
(a) a source of a first clip of frames of background video signals;
(b) a source of a second clip of frames of insert video signals;
(c) means for selecting each frame of said first clip in turn together with a corresponding frame of said second clip;
(d) means for defining a key frame initially enclosing a feature represented by video signals within an area of a correspondingly selected frame of said second clip;
(e) operator manipulable reshaping means for reshaping said key frame with reference to a desired area of the currently selected frame of said first clip where it is desired to insert said feature;
(f) means responsive to said reshaping means for generating one or more transforms adapted to reshape said feature to fit said desired area, and for generating a control image corresponding to the reshaped key frame;
(g) means responsive to said one or more transforms for reshaping said feature;
(h) means for storing the reshaped feature and the corresponding control image for each respective frame of said second clip until the reshaped features and corresponding control images have been derived and stored for every frame of said second clip; and
(i) means responsive to said stored and reshaped features and control images for inserting the reshaped features in the respective frames of said first clip.

12. A system as claimed in claim 11, wherein said means for defining said key frame comprises means for defining plural reference points corresponding to corners of said area and said reshaping means comprises means for manipulating each of said reference points.

13. A system as claimed in claim 11, wherein said operator manipulable reshaping means is arranged to enable each of the reference points to be defined individually.

14. A system as claimed in claim 11, wherein said operator manipulable reshaping means comprises a stylus and touch tablet combination.

15. A system as claimed in claim 11 wherein said inserting means is responsive to said control image on a pixel-by pixel basis to control the inserting of said reshaped features in said second clip.

16. A video signal processing system comprising:
(a) a source of a first clip of frames of background video signals;
(b) a source of a second clip of frames of insert video signals;
(c) means for selecting each frame of said first clip in turn together with a corresponding frame of said second clip;
(d) means for defining a key frame initially enclosing a feature represented by video signals within an area of a correspondingly selected frame of said second clip;
(e) operator manipulable means for reshaping said key frame with reference to a desired area of the currently selected frame of said first clip where it is desired to insert said feature;
(f) means responsive to said reshaping means for deriving one or more transforms adapted to reshape said feature to fit said desired area;
(g) means for storing said one or more transforms for each respective frame of said second clip until the one or more transforms for all frames of said second clip have been derived and stored;
(h) means for deriving a control image corresponding to the reshaped key frame for each frame of said second clip; and
(i) means responsive to said stored one or more transforms and said control images for reshaping the respective features and inserting them in the respective frames of said first clip, independently of said operator manipulated means.

17. A system as claimed in claim 16, wherein said means for defining said key frame comprises means for defining plural reference points corresponding to corners of said area and said reshaping means comprises means for manipulating each of said reference points.

18. A system as claimed in claim 16, wherein said operator manipulable reshaping means is arranged to enable each of the reference points to be defined individually.

19. A system as claimed in claim 16, wherein said operator manipulable reshaping means comprises a stylus and touch tablet combination.

20. A system as claimed in claim 16, wherein said inserting means is responsive to said control image on a pixel-by-pixel basis to control the inserting of said reshaped features in said second clip.

* * * * *